CIRCUIT ARRANGEMENT FOR THE AUTOMATIC AND CONTINUOUS ADJUSTMENT OF THE OPTICAL SHUTTER OF A TELEVISION PICK-UP CAMERA

Filed Sept. 2, 1966

INVENTOR
Erich Hitz
BY
Michael S. Striker
ATTORNEY

United States Patent Office 3,495,037

Patented Feb. 10, 1970

3,495,037

CIRCUIT ARRANGEMENT FOR THE AUTOMATIC AND CONTINUOUS ADJUSTMENT OF THE OPTICAL SHUTTER OF A TELEVISION PICK-UP CAMERA

Erich Hitz, Nuremberg, Germany, assignor to Grundig E.M.V. Elektro-Mechanische, Furth, Bavaria, Germany Filed Sept. 2, 1966, Ser. No. 577,016
Claims priority, application Germany, Oct. 27, 1965, G 45,040
Int. Cl. H01j *29/89*
U.S. Cl. 178—7.92 10 Claims

ABSTRACT OF THE DISCLOSURE

An arrangement for controlling the position of a shutter used in conjunction with television pick-up cameras. Two separate Schmitt trigger circuits connect a motor mechanically coupled to the shutter, to voltage supplies of opposite polarity, depending upon whether the shutter is to be opened or closed. A voltage from the light-sensitive element within the camera tube is applied to the Schmitt trigger circuits in the form of a controlled signal, and the trigger circuits respond by connecting the motor to either one voltage source or the other for moving the shutter in either one direction or another and opposite direction. Transistor switches operate the motor in accordance with the state of the trigger circuits.

The invention pertains to a circuit for the automatic and continuous adjustment of the optical shutter of a television pick-up camera wherein a control signal for the shutter adjustment motor is derived from the video signal which is directly proportional to the photocurrent of the image pick-up tube.

In order to provide an automatic adjustment of a television camera image pick-up tube to the respective illumination conditions, there is, in accordance with a known circuit used in connection with an image vidicon tube a control potential derived from the video signal which serves to regulate the bias potential on the signal plate with a time constant which is considerably larger than the time required for scanning of the image so that the median signal current is independent of the respective brightness of the scene and practically remains constant. Since, however, in practice brightness fluctuations occur sometimes which are so large that the regulation solely derived from the signal plate potential will not be sufficient, an optical shutter is additionally provided which is being controlled by the regulating potential. In this case the illumination control through the optical shutter may be considered the coarse, while that obtained from the plate potential is considered the fine regulation. The shutter control motor thus begins to operate only then when the regulation potential derived from the signal plate potential exceeds or goes below a given threshold value (German Patent 976,590).

A known electron tube circuit is being used to operate as a threshhold switch or a control signal amplifier for this purpose which acts as a differential type amplifier. This circuit contains two relays whereby a potential is applied to the shutter adjustment motor in such a manner that the optical shutter is adjusted in a desired sense. The range of this type of automatic regulation may be enlarged in accordance with another known circuit, by controlling the optical shutter by means of a photoresponsive resistance or other similarly acting light-sensitive element. The latter type control, however, may have a number of disadvantages. In normal television systems due to reasons of space it is actually not really possible to position the photoresistance in respect to the image surface in such a way that the entire light current will be measured. Since the brightness distribution, especially with objects having a short focus, decreases from the center toward the edge, errors in illumination may therefore be produced in case of an unfavorable position of the photo-resistance. Moreover, due to the very small surface available in a photoresistance, the resistance has a very high ohmic value, the control therefore being very strongly dependent upon the ambient temperature.

This disadvantage may of course be overcome by bringing the photo-resistance closer to the object of which the image is to be obtained. However, this would require a feedback signal and there is a further possibility that illumination errors may be produced because the photoresistance responds to an illumination range which is different from other, more distant portions of the image.

In accordance with the invention a circuit arrangement is provided by means of which the optical shutter may be automatically and continuously adjusted, the circuit being independent of whether the signal plate potential is controlled or not. The new circuit is in its application therefore, not limited to a pick-up tube of the vidicon type but may also be used with all other tubes.

The invention is more particularly characterized in that it is possible by way of an impedance transformer, to alternately control two trigger systems having respectively complementary transistors, an electronic switch being associated with each of the triggers and having a complementary transistor with respect to its associated trigger. The respective emitter-collector paths of the complementary transistors are disposed in the circuit of the shutter control motor in such a way that, in accordance with the change of direction of the control signal the motor receives a positive or negative adjustment potential relative to its reference potential.

The invention may be better understood with reference to the three illustrations showing the circuit in principle and the accompanying description. The embodiments have been described hereinbelow based on the use of a vidicon as an image pick-up tube. The various potentials which have been indicated are those referring to a vidicon tube.

Figures 1, 2, 3:
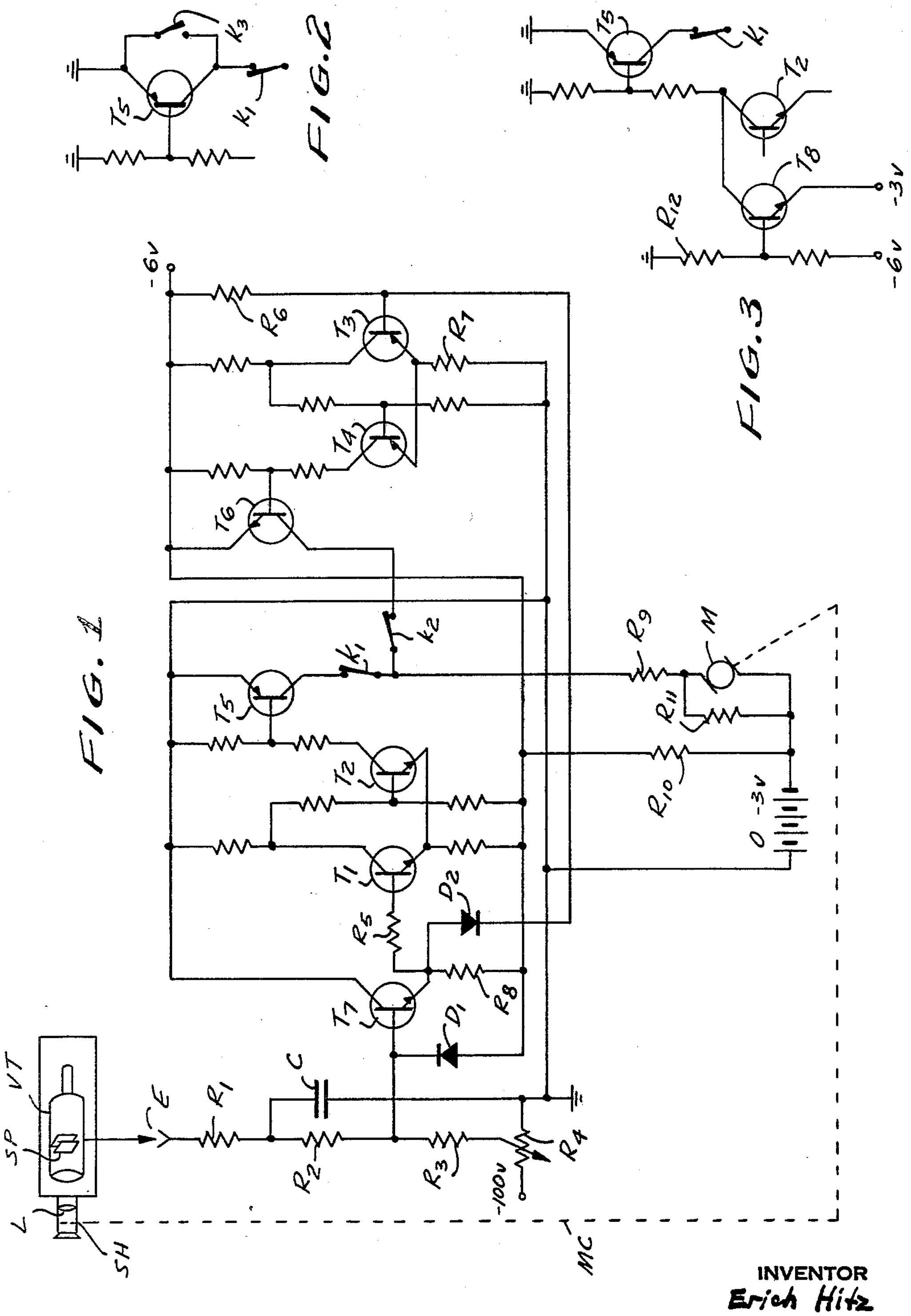
FIG. 1 shows the overall circuit arrangement together with a shutter adjustment motor.
FIG. 2 shows a portion of the circuit of FIG. 1 with a safety contact which operates to shut off the circuit.
FIG. 3 shows the circuit of FIG. 2 using an electronic switch.

The circuit arrangement in accordance with the invention essentially comprises two bistable systems for instance two Schmitt triggers shown at T1, T2 and T3, T4, respectively. The first trigger T1, T2 is connected by way of an electronic switch T5 with the shutter adjustment motor M (reversible type) and effects the operation of the motor in the one, for instance in the forward sense, while the second trigger T3, T4 causes the shutter adjustment motor M to operate in the opposite direction by way of the electronic switch T6. The trigger transistors T3, T4, corresponding to the respective operative sense of the shutter adjustment motor M are complementary to the trigger transistors T1, T2. The transistors of the two electronic switches T5 and T6 must of necessity be complementary to those of their associated triggers. In the embodiments shown, the first trigger T1, T2 comprises NPN transistors and an associated switch PNP transistor T5. Consequently, the second trigger T3, T4 comprises PNP transistors and the associated NPN switch transistor T6. The shutter adjustment motor on the one side is connected to a supplementary source of potential Q of —3 volts, which preferably comprises a rechargeable cell, such as a nickel-cadmium cell. The other motor terminal, as shown at point P, may be connected to ground by way of the switch transistor T5 or through the switch T6 to a potential of —6 volts.

The video signal may be derived from a vidicon tube VT including signal plates SP, disposed within a video pickup camera including a lens element L and a shutter element SH. The shutter is connected by way of a mechanical connection MC to the adjustment motor M for control thereby.

The operation of the circuit arrangement of the invention is as follows:

The control derived from the video signal is obtained as a potential E from the signal plates of the vidicon tube and is applied by way of an RC combination R1C and a base potential dropping resistance R2 to the base of the transistor T7 which acts as an impedance transformer.

In the embodiment described, the reference potential comprises a source of —100 volts which is applied over the base potential dropping resistor R3 to the base of the impedance transformer T7 and the required value of which is adjustably controlled by means of the potentiometer R4. A diode D1 serves as a limiter for the blocking potential of the base emitter path of the impedance transformer T7.

The emitter of the impedance transformer T7 may be connected to the two triggers T1, T2 and T3, T4 respectively over resistance R5 in one case and through diode D2 in the other case. During the inoperative state, the two first transistors of the two triggers, that is T1 and T3 are conducting; accordingly, the two other trigger transistors T2 and T4 are blocked and therewith the respective electronic switches T5 and T6 in their collector circuits. Consequently the shutter adjustment motor receives no potential and does not run.

As the illumination on the screen of the vidicon increases, the plate potential will decrease. This causes the emitter potential of the impedance transformer T7 and therewith also the basis potential of the trigger transistor T1 to become more negative, so that the first trigger T1, T2 is activated. Trigger transistor T2 thus becomes conductive and opens switch T5. The shutter motor M, one terminal of which is connected to the potential source Q of —3 volts, is now connected with its other terminal to ground over the collector-emitter path of switch transistor T5. The motor thus starts operating and adjusts the shutter in the direction of a smaller shutter opening, which is assumed to be the forward direction, until, through the operation of the adjustment mechanism the illumination strength effective on the vidicon again reaches the required value. The signal plate potential of the vidicon thereby again reaches the required level so that trigger T1, T2 again assumes its original condition.

As the illumination effective on the screen of the vidicon decreases, an analogous operation of the circuit takes place with respect to the second trigger T3, T4. The shutter adjustment motor M is then connected with the terminal to the potential of —3 volts and with the other terminal to —6 volt potential, accordingly turning in the opposite direction assumed to be the reverse, the shutter being adjusted to give a larger opening.

The conection of the impedance changer T7 with the second trigger T3, T4 is made over a diode D2 and not over an ohmic resistance since otherwise the base current of the transistor T3 would be flowing from ground over the resistance R7, its base-emitter path and over the resistance R8 toward the —6 volt point. Since the base-emitter path when conductive, has a low ohmic value, the emitter potential of the impedance changer T7 would never become more negative than the emitter potential of the triggers T3, T4, and accordingly could therefore not become operative. For the same reason, it would not be possible to omit the resistance R6.

Keeping in mind the bias potential of diode D2, the resistances of the second trigger T3, T4 must be given a value other than those of the first triggers T1, T2.

In another embodiment of the invention, the circuit arrangement is such that the potential source Q which serves as the operating potential source for the shutter motor, receives a charge when the shutter is adjusted in the direction of a larger opening. The charging current which simultaneously comprises the motor current, flows from —6 volt source over the electronic switch T6, the resistor R9, the motor M and over the potential source Q. A small additional charging current is continously supplied over the resistance R10.

In order to prevent an overrun of the shutter motor M, whenever the shutter attains its respective limit positions, mechanically actuated limit switches K1 and K2 are provided in the motor current paths which are normally closed. When the shutter motor M has adjusted the optical shutter to its smallest aperture, the shutter opens limit switch K1. The motor accordingly becomes inoperative. Analogously, the limit switch K2 is opened when the shutter has attained its largest possible opening.

In order to effect an immediate shutdown of the motor before it overloads, the motor is shunted by means of the resistor R11.

Generally, it is desirable that the light-sensitive screen of the image pick-up tube not be damaged through illumination which may be too strong or unintended. For this reason, whenever the camera becomes inoperative or in case of a failure of the supply potential, the shutter is automatically and fully closed. This may be achieved by the provision of a relay for the purpose of remotely controlling the operating potential without using too much energy for the switching operation in the following manner:

As shown in FIG. 2, a special relay contact K3 is provided which is disposed between the emitter and the collector of the electronic switch T5 and is open in the activated condition. In case of supply potential failure, contact K3 shunts the collector-emitter path and will cause a current to flow through the shutter motor M until the shutter has been completely closed which means until contact K1 opens when the limit position of the shutter has been attained.

The contact K3 may also be replaced by means of an electronic switch as shown in FIG. 3. This switch, shown to comprise transistor T8 is normally blocked so that it acts like the opened contact K3. In case of failure of the supply potential, the —6 volt which normally acts to block the transistor T8 becomes ineffective. Consequently base current flows through the resistor R12 causing transistor T8 to become conductive; transistor T5 thereby becomes conductive and a motor current flows causing the shutter again to be completely closed.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A control arrangement for adjusting the optical shutter of a television pick-up camera, comprising, in combination, light-sensitive means providing a controlling signal dependent upon the intensity of the light impinging upon said camera; first switching means triggered by said controlling signal for moving said shutter in a first direction; second switching means triggered by said controlling signal for moving said shutter in a second direction, one of said switching means being operative depending upon the electrical characteristic of said controlling signal; motor means mechanically coupled to said shutter for adjusting the position of said shutter as a function of said controlling signal; a first voltage source connected to said motor means by said first switching means when moving said shutter in said first direction; a second voltage source opposite in polarity to said first voltage source and connected to said motor by said second switching means when moving said shutter in said second direction, whereby said shutter is moved in a direction determined by said controlling signal through the operative state of one of said switching means.

2. The control arrangement as defined in claim 1 including impedance converting means responsive to said controlling signal and changing impedance as a function of the voltage of said controlling signal.

3. The control arrangement as defined in claim 2 wherein said impedance converting means comprises an impedance changing transistor; blocking bias potential means connected to the base of said impedance changing transistor; and means for applying said controlling signal to said base of said transistor.

4. The control arrangement as defined in claim 3 including a diode in the base-emitter circuit of said impedance changing transistor for limiting said blocking potential.

5. The control arrangement as defined in claim 4 including a resistor between said impedance changing transistor and one of said switching means; and a diode connected between said impedance changing transistor and said second switching means.

6. The control arrangement as defined in claim 1 wherein each of said switching means comprises a Schmitt trigger circuit, the Schmitt trigger circuit of said switching means having a pair of transistors complementary to those in the Schmitt trigger circuit of said second switching means.

7. The control arrangement as defined in claim 6 including a switching transistor connected to the output of said Schmitt trigger circuit.

8. The control arrangement is defined in claim 7 including limit switches connected between said switching transistor and said motor means, said limit switches being actuated in response to predetermined extreme positions of said shutter.

9. The control arrangement as defined in claim 7 including means for short circuiting said switching transistor when said source of voltage is inoperative.

10. The control arrangement is defined in claim 9 wherein said means for short circuiting said switching transistor comprises a transistor circuit.

References Cited

UNITED STATES PATENTS

| | | |
|---|---|---|
| 3,061,673 | 10/1962 | Fathaver et al. |
| 3,079,851 | 3/1963 | Back. |
| 3,086,077 | 4/1963 | Mayer. |
| 3,102,163 | 8/1963 | Sennhenn. |

FOREIGN PATENTS

| | | |
|---|---|---|
| 1,035,708 | 7/1966 | Great Britain. |

ROBERT L. GRIFFIN, Primary Examiner

RICHARD MURRAY, Assistant Examiner

U.S. Cl. X.R.

178—7.2